Figure 1:
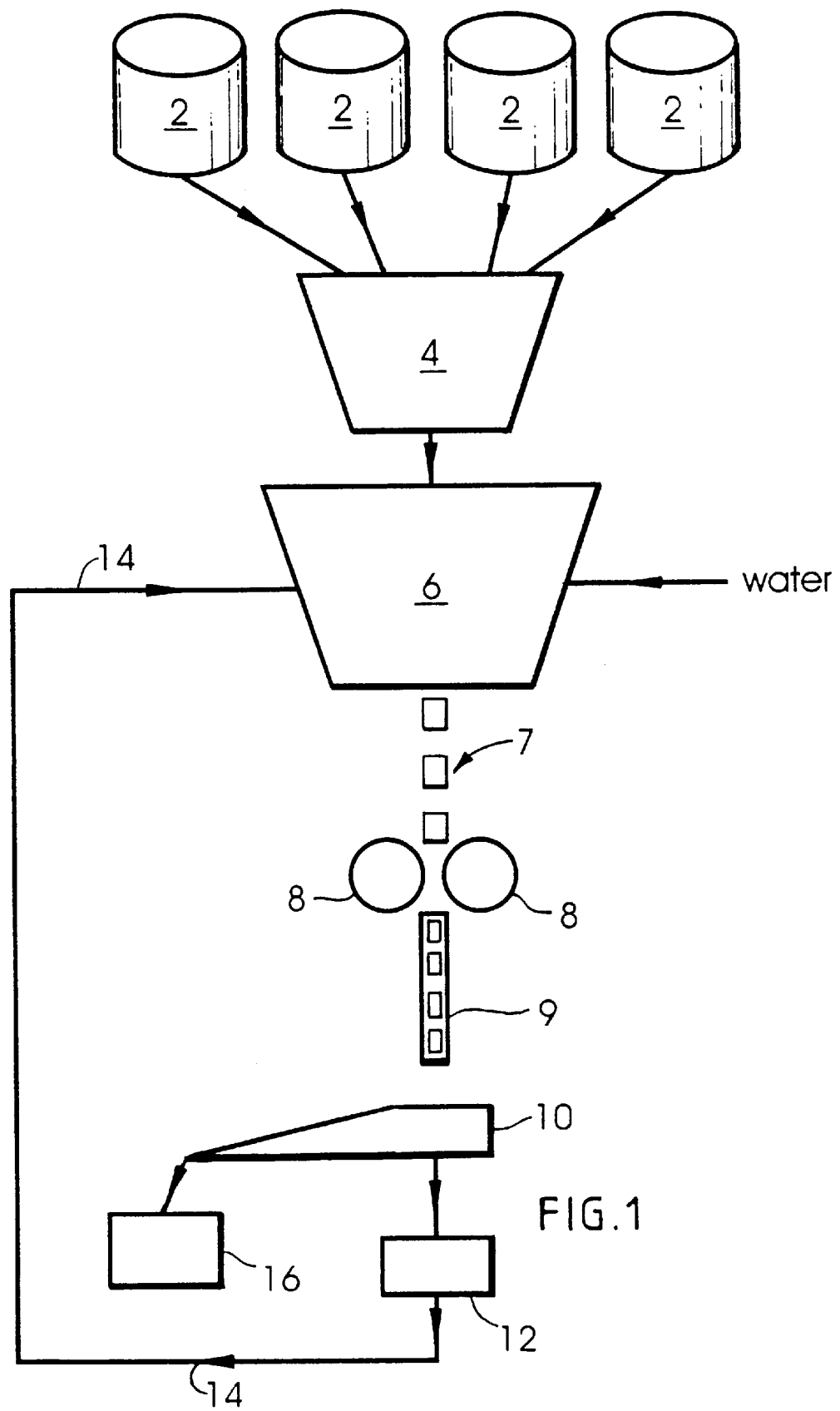

United States Patent [19]

Bilke

[11] Patent Number: 5,912,403

[45] Date of Patent: Jun. 15, 1999

[54] COLD BRIQUETTE OF WASTE MATERIALS AS AN AGGREGATE FOR SMELTING FURNACES OF AN IRON FOUNDRY AND METHOD OF PRODUCING THE SAME

[75] Inventor: Thomas Bilke, Martinsried, Germany

[73] Assignee: Wishbone Investments Limited, Channel Islands, United Kingdom

[21] Appl. No.: 09/032,487

[22] Filed: Feb. 27, 1998

[30] Foreign Application Priority Data

Mar. 1, 1997 [DE] Germany ............................ 197 08 376

[51] Int. Cl.⁶ ...................................................... C21C 7/00
[52] U.S. Cl. .................................. 75/773; 75/313; 75/327
[58] Field of Search .............................. 75/313, 327, 353, 75/773

[56] References Cited

U.S. PATENT DOCUMENTS

| 3,857,698 | 12/1974 | Gilpin et al. . |
| 4,451,293 | 5/1984 | Kitamura et al. . |
| 4,814,005 | 3/1989 | Thompson . |
| 4,865,642 | 9/1989 | Huddleston . |

FOREIGN PATENT DOCUMENTS

| 3732351 | 4/1989 | Germany . |
| 3942902 | 8/1990 | Germany . |
| 4109214 | 9/1992 | Germany . |
| 4207265 | 9/1993 | Germany . |
| 4308294 | 9/1994 | Germany . |
| 4416699 | 12/1994 | Germany . |
| 4331159 | 5/1995 | Germany . |

*Primary Examiner*—Ngoclan Mai
*Attorney, Agent, or Firm*—Ohlandt, Greeley, Ruggiero & Perle

[57] ABSTRACT

The invention relates to the use of a briquette of waste materials as an aggregate for smelting furnaces of an iron foundry, in particular in cupola furnaces or other shaft furnaces. The object of the invention is to disclose the use of a briquette of waste materials as an aggregate for smelting furnaces of an iron foundry, in that it can be produced in an economical manner, is sufficiently heat-resistant, is present with a similar alloy composition even with fluctuating contents in the starting components and does not result in any additional charge of pollutants into the smelting process. The object is attained in that the corresponding waste substances of an iron foundry, in particular cupola-furnace top-gas filter dust, and/or filter dust from the preparation of molding said and/or filter dust from the cleaning shop and/or filter dust from the grinding shop as well as the waste substances magnesium-oxide filter dust and/or limestone dust acting as hydraulic binders are collected, mixed and moistened, and the entire mixture is pressed cold under pressure in molds to form briquettes.

6 Claims, 1 Drawing Sheet

COLD BRIQUETTE OF WASTE MATERIALS AS AN AGGREGATE FOR SMELTING FURNACES OF AN IRON FOUNDRY AND METHOD OF PRODUCING THE SAME

The invention relates to the use of a briquette of waste materials as an aggregate for smelting furnaces of an iron foundry, in particular in cupola furnaces or other shaft furnaces. The invention also relates to a method of manufacturing these briquettes.

Filter dusts are fine-grained particles which occur in the foundry industry and which are captured to reduce the emission of dust from a foundary to an environmentally acceptable level by suitable filter units. These dusts are produced from various areas in a foundry, such as in smelting operations in cupola furnaces, electric-arc furnaces, rotary-drum furnaces by filtering the dust-containing waste gases as well as in the preparation of sand for the moulding shop and in the cleaning shop. Depending on the manner in which it was formed, this dust has different chemical compositions. In this way, the dust from smelting operations contains between 5% and 25% of iron or iron oxides, sulphur and sulphur-containing compounds and considerable quantities of silicon oxide (up to 40%), calcium oxide (up to 20%) and aluminium oxide (up to 25%) are further constituents. In addition, this dust also contains heavy metals which can be absorbed in the lungs of the foundry workers and which result essentially from the use of scrap. The dust from the preparation of sand in a moulding ship of a foundry consists primarily of moulded material and binder particles such as silicon oxide, aluminium oxide and carbon. Contamination with heavy metals need not be mentioned here. Dusts are produced in a cleaning shop of the foundry which consist of a mixture of moulded material and metallic dust. In addition, during the production of ductile cast iron a filter dust is formed which consists almost exclusively of magnesium oxide. These waste materials in the form of dust occur in foundry operations and are collected in filters and it is appropriate to dispose of them. In the treatment of metallic products considerable quantities of waste materials and other small-particle metallic residues occur, such as grinding dust, punchings, cuttings etc., which cannot readily be utilized.

The use of filter dusts and the re-use of small-particle metallic residues in smelting operations in foundries is known from the prior art.

The publication DE 44 16 699 A1 describes a process for using metallic residue material, in particular cut material, in smelting furnaces according to the invention, in which it is pressed with dust to form a briquette. The inventor introduces a mixture of small-particle residues, for example from punching, cuttings and cupola-furnace top-gas filter dust, which is briquetted and which can subsequently be used in cupola furnaces for the production of cast iron. The disadvantage of this invention is that the cupola-furnace top-gas filter dust contains considerable quantities, approximately from 5% to 12%, of sulphur and sulphur-containing compounds in the chemical composition. An enrichment of the sulphur content associated therewith has an adverse effect as it produces viscosity of the melt, hardness of the casting and the formation of bubbles. It is also inconceivable that pressure-resistant briquettes, which are subjected to the rough treatment of a cupola furnace, can be produced by cold briquetting at the specified compacting pressure without suitable binders.

In addition, a process is known from the publication DE 43 08 294 A1, which describes the production of slag-forming briquettes for use in smelting furnaces, the briquettes being produced from filter dusts and foundry sand. The disadvantage according to the invention is that a sulphite lye is used as a binder. As already indicated, the sulphur compounds of this lye have an adverse effect upon the melt. A further disadvantage is that the waste-gas concentration of $SO_2$ and $SO_3$ increases.

A process for producing briquettes without binders from steel-works dust is known from the publication DE 37 32 351 A1. In this process specification, iron-containing steel-works dusts are heated in the rotary-drum furnace to a briquetting temperature of over 500° C. under an inert atmosphere. The disadvantage of this invention is that the steel-works dusts have to be heated with a considerable outlay in energy to over 500° C. in order to be able to produce pressure-resistant briquettes. As a result of the high briquetting temperature an increased wear of the briquetting rollers should also be mentioned, which considerably reduces the service life.

The invention according to the publication DE 39 42 902 A1 relates to a process for processing dusts which occur in a cupola furnace and which in turn are blown into the combustion zone of the cupola furnace. The disadvantage of this invention is that, although the concentration of zinc increases, the concentrations of sulphur, heavy metals and other substances injurious to the furnace increase at the same time, and, as is known, this can have an adverse effect upon the melt.

A process for operating a cupola furnace is described in the publication DE 41 09 214 A1. According to the invention the cupola-furnace top-gas dusts are collected from the filter units and are introduced into the cupola furnace again by way of the air supply. The same disadvantages are found with this process as in the case of the publication DE 39 42 902 A1.

The conversion of filter dusts of the foundry industry into a disposable product is described in the publication DE 42 07 265 A1. Natural binders, such as glucose syrup, maize starch etc., are added as binders. The description of the invention contains a general technical teaching. Since foundry filter dusts from the individual processes and sites of occurrence have very different chemical compositions, it is inconceivable that bodies with adequate strength can be produced. In view of the lack of the individual recipe details of the filter dusts used, a reproducible disclosure is absent. The operability or industrial application is therefore not regularly provided.

The publication DE 43 31 159 C1 discloses a process for producing charge materials for use in the iron, steel and foundry industry. In this case, these charge materials of mixtures essentially consisting of waste products are used for substituting olivine, gravel, dolomite, bauxite, andalusite etc. These synthetic charge materials for use in metallurgy are prepared by the process steps of pulverization, briquetting, pelletization or sintering. Binders are used to improve the bonding of the briquette. By using a process adapted to the mixing ratio of the components required in each case, charge materials of constant quality which are specific to the property are produced. The disadvantage of this solution is that the object is to produce "synthetic charge materials" from waste products and not primarily the re-use thereof in the production process. Furthermore, in order to form a firmly binding briquette with a high degree of green bond, different binders must additionally be added. In this case, the only available binders are those from waste products which do not permit particularly strong and heat-resistant bonding, for example molasses from the sugar industry, or which introduce substances injurious to the furnace into the smelting process.

The publication DE 43 08 294 discloses a process for producing slag-forming briquettes for use in smelting furnaces, in which the briquette is formed from dusts or sands which occur industrially and which contain $SiO_2$ in particular. With the addition of sulphite lye, preferably from the wood-pulp industry, surprisingly stable briquettes are formed after compaction. A disadvantage of this process is the unfavourably high proportion of sulphur associated therewith. In addition, the sulphite lye required in order to achieve a strong bond does not occur in iron-foundry industry itself and is therefore not directly available.

The object of the invention is to disclose the use of a briquette of waste materials as an aggregate for smelting furnaces of an iron foundry, in that it can be produced in an economical manner, is sufficiently heat-resistant, is present with a similar alloy composition even with fluctuating contents in the starting components and does not result in any additional charge of pollutants into the smelting process.

It is therefore an object of the present invention to provide for the use of a briquette of waste materials as an aggregate for smelting furnaces of an iron foundry, characterized in that the briquette consists exclusively of waste materials, the said waste materials contain hydraulic binders in the form of $M_gO$ filter dust and/or lime stone dust, and the briquette is bonded hydraulically by the addition of defined quantities of water by means of the $M_gO$ and/calcium-oxide dust bonding phases. Such a briquette requires only the use of water to enable a good bond to form thereby to provide a briquette which is stable and pressure resistant and which is formed solely from waste materials which would otherwise be discarded or discharged into the atmosphere. This in itself enables a highly efficient recycling operation to be performed using such a briquette.

Preferably the briquette consists exclusively of waste materials from an iron foundry and is used therein as an aggregate for smelting furnaces. This provides an environmentally friendly way of recycling what would otherwise be waste materials.

Preferably a mixing ratio of the waste materials required to ensure the bonding strength of the briquette is set in that, in addition to the waste materials exclusively of an iron foundry, an admixture of $M_gO$ filter dust and/or lime stone dust and/or white lime takes place.

According to a further aspect of the present invention there is provided a method of producing a briquette of waste materials comprising:

recovering filter dust and other waste materials;

mixing the filter dust and other waste materials with MgO and/or limestone dust;

adding a defined quantity of water to the mixture;

and pressurising the watered mixture, causing hdyraulic bonding to occur by way of the magnesium-oxide and/or calcium-oxide bonding phases thereby to produce solid briquettes.

The MgO filter dust from iron foundries consists of up to more than 70% of MgO with admixtures of $Na_2O$, chlorides and $SiO_2$, with an average pH value of 10·3. The limestone filter dust, which occurs during the recovery of limestone rubble, consists of up to more than 90% of $CaCO_3$ with smaller admixtures of $SiO_2$, and $Al_2O_3$. Calcium hydroxide (white lime) produced industrially can likewise be used advantageously as a binder.

The filter dusts occurring in iron foundries, such as top-gas filter dust and/or filter dusts from the smelting operations of cupola furnaces, electric-arc furnaces and/or rotary-drum furnaces as well as filter dusts from the preparation of moulding sand, from the cleaning shop and/or the grinding shop, are pressed cold (i.e not at an elevated temperature) to form dimensionally stable briquettes while using hydraulic binders and water.

The invention is described below with reference to exemplary embodiments only and the accompanying FIG. 1.

An exemplary process for producing briquettes in accordance with the present invention begins as follows. Filter dusts from the preparation of sand in the moulding shop, fine-grained coke breeze, cupola-furnace top-gas dust, bentonite-bonded used foundry sand, cleaning-shop dust, grinding-shop dust, different fine-particle iron particles of an iron foundry and MgO filter dust and limestone dust are stored in a plurality big bags or of storage silos 2, and are metered into a suitable mixer 6 by way of a weighing container 4 in order to ensure a constant quality of the briquette to be produced, and are mixed thoroughly in the mixer 6 with the addition of water. During the mixing procedure of approximately 2 minutes in the mixer, from 2 to 20 liters of water are sprayed onto 100 kg of mixed material. This mixture is compacted into briquettes in a rolling-briquetting press 8 with pre-compaction by a screw 7 and with an overall pressing force of from 550 to 1500 kN/cm roller 8 width with a roller 8 diameter of 520 mm to form a flat briquette shape with the dimensions 50×32×14 mm. Briquette shapes with smaller or larger dimensions are also possible, however, which are produced with different roller diameters. The mixed briquettes produced in this way have a green bond which is sufficient for sieving in the sieving machine 10 to take place immediately afterwards. This passage through the sieve 10 is advantageous since all the fine particles are thereby removed which can be returned to the rolling-briquetting press 8 again by way of a conveyor belt 14 and a bucket conveyor 12. The briquettes 9 are conveyed to the storage site or directly into the containers 16 by conventional conveying means.

Those skilled in the art will appreciate that the term green bond is apt to cover those briquettes 9 which have been pressed via the rollers 8 but have not yet had sufficient time to completely set and therefore harden. In the process described above it customarily takes around 24 hours in ambient conditions for the briquettes to become fully hardened and for the bonding process caused by the pressure supplied by the rollers 8 to become sufficiently rigid such that the briquettes will not deteriorate or crumble. Thus the term green bond covers the case where the briquettes have only recently been formed and are therefore not fully hardended and ready for use.

In a first embodiment the mixture utilised within the mixer 6 consists of:

from 5 to 20 (ideally 10)% by weight of MgO filter dust and/or limestone filter dust, from 40 to 80 (ideally 60)% by weight of filter dust from the preparation of moulding sand, from 20 to 40 (ideally 30)% by weight of fine-grained coke breeze.

The briquettes produced with this embodiment constitute a fuel substitute which can advantageously be used as a coke substitute in a cupola furnace or as a carburizing agent in an electric-arc furnace. Briquettes formed thereby develop a calorific value of over 10,000 kJ/kg. The briquetting of a mixture with from 5 to 20% by weight of MgO filter dust and/or limestone filter dust and from 80 to 95% by weight of filter dust from the preparation of moulding sand is likewise advantageous.

In the examples shown in the FIGURE, there are four silos 2 illustrated. This is merely exemplary and more or less silos may be used in the process. In the example with reference to the first embodiment of the mixture above, one silo contains magnesium oxide filter dust, another silo contains limestone filter dust, a third silo contains filter dust from the preparation of moulding sand and the last silo contains fine-grained coke breeze.

In the second embodiment the mixture consists of:
from 5 to 20 (ideally 10)% by weight of MgO filter dust and/or limestone filter dust,
from 5 to 40 (ideally 30)% by weight of filter dust from cleaning-shop dust or grinding-shop dust,
from 5 to 80 (ideally 60)% by weight of fine-particle iron particles from the metal-working industry.

The object of this embodiment is to re-use the high iron content of cleaning-shop dust or grinding-shop dusts economically in the smelting process. The iron content of these briquettes amounts on average to between 40% and 80%. In this case an enrichment with small-particle iron particles, such as fine-borings, turnings, from the metal-working industry is advantageously possible. In order to avoid comprehensive analyses of these small-particle iron particles which occur, it is advisable to introduce only pure small particles of cast iron into the mixture. In this way, it is even conceivable that the iron-containing dusts produced by each smelting furnace and the small-particle iron particles produced from the separate mechanical working of the castings are supplied briquetted to the said smelting furnace again for further production in accordance with this inventive solution, in which case it is possible to dispense with the above-mentioned comprehensive analyses for maintaining the required quality of the cast iron to be produced. The briquetting of a mixture of from 5 to 20% by weight of MgO filter dust and/or limestone filter dust and from 80 to 95% by weight of cleaning-shop and/or grinding-shop dust with the addition of from 2 to 20 liters of water per 100 kg of mixture is likewise advantageously possible.

In the third embodiment the mixture consists of:
from 5 to 20 (ideally 10)% by weight of MgO filter dust and/or limestone filter dust,
from 5 to 30 (ideally 20)% by weight of cupola-furnace top-gas dust,
from 60 to 90 (ideally 70)% by weight of used foundry sand (bentonite-bonded).

The object of this embodiment is the thermal utilization of the cupola-furnace top-gas dust, which consists of up to 40% of $SiO_2$, iron and iron oxide with small admixtures of $Al_2O_3$, MnO, CaO, C and S, and, as is known, should not be used in a concentrated form on account of its sulphur content and the sulphur compounds. It is therefore expedient to aim for an optimum dilution with other waste materials which do not harm the furnace. Cupola-furnace top-gas dust is advantageously processed in that, mixed thoroughly with MgO filter dust and/or limestone filter dust, it produces a slag-forming material. The variant illustrated should be regarded as being an optimum slag former. A mixture of from 5% to 20% of MgO filter dust and/or limestone filter dust, from 5 to 30% by weight of cupola-furnace top-gas filter dust and from 60 to 90% by weight of filter dust from the preparation of moulding sand is also, however, advantageous.

In the fourth embodiment the mixture consists of:
from 5 to 20 (ideally 10)% by weight of MgO filter dust and/or limestone filter dust,
from 5 to 30 (ideally 20)% by weight of cupola-furnace top-gas dust,
from 10 to 40 (ideally 30)% by weight of filter dust from the preparation of moulding sand,
from 20 to 60 (ideally 40)% by weight of cleaning-shop filter dust and/or grinding-shop dust.

The object of this embodiment is to attempt to produce a mixture containing nearly all the filter dusts occurring in a foundry.

In all of the four embodiments disclosed above, it is an object to be able to produce a briquette which is resistant to pressure when it is formed. This means, that the bonding which occurs by virtue of the mixture of the contents of the silos 2 with water in the mixer 6, and having been formed into briquettes 9 by the pressure applied by the rollers 8, should be sufficiently strong to prevent the briquettes produced thereby from crumbling or deteriorating during transportation and/or use. Whilst, in the prior art particularly, it has been possible to achieve such a pressure resistant briquette by forming them in an atmosphere of greatly increased temperature, the present invention aims to provide pressure resistant briquettes by cold bricketting, that is by not elevating the temperature of either the mixer 6 or the environment around the rollers 8.

The process for producing pressure-resistant briquettes of all the described embodiments is characterized in that the filter dust in the iron foundries is collected in big bags or closed silos, is conveyed by silo vehicles to the respective briquetting plant and is blown into the individual storage silos. Removal into the closed weighing container 4 is carried out by way of screw conveyors. After that, the filter dust is mixed thoroughly in the positive pan mixer 4 with the addition of water which is sprayed in. The mixture produced in this way is then compacted into briquettes in a compactor rolling-press 8 or in a stamping-briquetting press. The briquettes 9 produced by a rolling-briquetting press or a stamping-briquetting press can be produced with external dimensions in the ranges of between 1 cm and 15 cm, since an adequate passage of gas through the cupola furnace is possible only in this way. After the briquette has been ejected from the rolling-briquetting press, sieving takes place by way of the sieving machine 10. The fine particles are returned to the rolling-briquetting press 8 again by way of the conveyor belt 14, and the bucket conveyor. The stable briquettes of large size arrive directly in a conveying means from the screening machine and are filled into the container and are conveyed back to the foundry and are used again as aggregate. The required pressing force in all the mixtures of filter dust with an hydraulic binder amounts to from 10 to 80 kN/cm operating width in the rolling-briquetting press and from 5 to 40 $kN/cm^2$ when a stamping-briquetting press is used.

The need for the sieving machine 10 results from the fact that as soon as the briquettes 9 are produced, they have the characteristic green bond which has been described above. The sieving machine 10 therefore serves to ensure that any loose particles forming part of the briquettes are removed from the bulk of the briquette body (which would otherwise probably become loose or fall off once the bonding process has fully hardened) and are returned via the conveyor belt 14 to the mixer 6 so that they may be reused in the process. This ensures that the briquettes which are passed to the containers 16 are not likely to crumble or have particles falling or flaking thereof.

It should be mentioned at this point that the embodiments already illustrated for briquetting filter dusts can also be compacted without the use of MgO filter dust and/or limestone filter dust as an hydraulic binder, in which case, however, a substantial increase in the pressing forces is an essential pre-condition for achieving the required strength, as a result of which this solution is uneconomic in practice.

The necessary specific pressing force in all the mixtures of filter dust without an hydraulic binder amounts to from 40 to 140 kN/cm operating width in the rolling-briquetting press and from 20 to 80 kN/cm$^2$ when a stamping-briquetting press is used.

Those skilled in the art will appreciate that the term hydraulic binder is intended to cover the case where water has been added to the mixture to act as a binding agent in order to complete the chemical binding process. Pressure is applied to the mixture via the rollers 8 in order to accelerate this binding process. The mixture is compressed in order to allow the briquettes formed to harden quicker than would otherwise be the case without this compression.

In the examples described above it is the mangesium-oxide and or calcium-oxide bonding phases which react with the water to create the chemical bond of sufficient strength to form the briquettes via the cold briquetting process.

I claim:

1. A cold bricketted solid briquette of waste materials as an aggregate for smelting furnaces of an iron foundry, characterized in that the briquette consists exclusively of waste materials, the said waste materials contain hydraulic binders in the form of MgO filter dust and/or limestone dust, and the briquette being bonded hydraulically by defined quantities of water by means of the magnesium-oxide and/or calcium-oxide bonding phases.

2. A cold bricketted solid briquette of waste materials as an aggregate for smelting furnaces of an iron foundry according to claim 1, characterized in that the briquette consists exclusively of waste materials of an iron foundry and is useful as an aggregate for smelting furnaces.

3. A cold bricketted solid briquette of waste materials as an aggregate for smelting furnaces of an iron foundry according to claim 2, characterized in that a mixing ratio of the waste materials required to ensure the bonding strength of the briquette is set in that, in addition to the waste materials exclusively of an iron foundry, an admixture of MgO filter dust and/or limestone dust and/or white lime has been utilized.

4. A cold bricketted solid briquette of waste materials as an aggregate for smelting furnaces of an iron foundry according to claim 1 characterised in that the hydraulic binding has been achieved by addition of water and formation of the briquette under pressure.

5. A cold briquetting method of producing a briquette of waste materials for use as an aggregate for smelting furnaces of an iron foundry, the method comprising:

recovering filter dust and other waste materials;

mixing the filter dust and other waste materials with MgO and/or limestone dust;

adding a defined quantity of water to the mixture causing hydraulic bonding to occur by way of the magnesium-oxide and/or calcium-oxide bonding phases;

and pressurising the unheated watered mixture, thereby to produce solid briquettes.

6. A cold briquetting method for producing a solid briquette of waste materials under ambient conditions for use as an aggregate for smelting furnaces of an iron foundry, the method comprising:

recovering filter dust and other waste materials of an iron foundry;

mixing the filter dust and other waste materials with MgO and/or limestone dust;

adding a defined quantity of ambient water to the mixture causing hydraulic bonding to occur by way of a magnesium-oxide and/or calcium-oxide bonding phases; and pressurising the unheated waste mixture to thereby produce a dimensionally stable cold bricketted solid briquette which is resistant to crumbling during transportation or use.

* * * * *